3,155,734
PROCESS FOR SEPARATION OF PHENOLS FROM AQUEOUS MIXTURES CONTAINING THEM
Heinrich Merkel, Essen, Germany, assignor, by mesne assignments, to Koppers Company, Inc., Pittsburgh, Pa., a corporation of Delaware
No Drawing. Filed June 8, 1961, Ser. No. 115,614
1 Claim. (Cl. 260—621)

The present invention relates to a process for separation of phenols from aqueous mixtures, for example aqueous crude carbolic acid, by liquid-liquid extraction with a liquid which dissolves phenol.

It is known that aqueous solutions of phenols are treated with extraction liquids which dissolve the phenols in more or less amount, so that an aqueous phase poor in phenol is formed in addition to the extraction medium enriched with phenol. Benzene, high boiling petroleum or tar fractions, if desired with addition of tar bases, also organic compounds consisting of the class of ethers, such as isopropyl ether, including also esters, for example butyl acetate or tricresylphosphate, have been used for this purpose as extraction media.

The above-named extraction media have been used industrially to a certain extent. The phenol is then separated from the extraction liquids enriched with phenol in some cases by distillation and in other cases by chemical reaction with caustic alkali solutions with formation of aqueous phenolate solutions.

The usefulness of extraction liquids for this purpose is dependent on the distribution factor of the extraction liquid for phenol in relation to water, on the water-solubility or water-insolubility of the extraction liquid, and on its stability to hydrolytic decompositoin. Small distribution factors stipulate a high expenditure for extraction liquid, number of extraction stages, and a corresponding expenditure for the separation of the phenols from the extraction liquid; the water-solubility of the extraction media results in losses of the latter and usually also special processes for treatment of the water contaminated with the extraction liquid. Despite high distribution factors a large number of solvents cannot be used for industrial operation because of their sensitivity to hydrolytic influences.

The extraction media previously used in technical plants in practical operation have distribution factors which generally do not exceed 20–24, calculated on an approximately 1% aqueous phenol solution. Moreover, the known extraction media are not absolutely water-insoluble but, on the contrary, water-solubilities of several percent could be observed.

It has now been found that organic liquids consisting of the class of compounds containing a benzoyl group have not only a distribution factor which is to some extent considerably superior to the previously known distribution factors, but they also simultaneously possess an immeasurably low water solubility.

For example, acetophenone, benzophenone (stable or metastable), benzaldehyde, esters of benzoic acid, and similar high-boiling compounds with a benzoyl group belong to this group of benzoyl compounds.

Furthermore, mixtures of such compounds with other known phenol-dissolving liquids, such as benzene or isopropyl ether, have distribution factors which are also higher than those of the previously known, comparatively low-boiling extraction liquids.

For example, the following distribution factors could be ascertained:

| Solvent: | Distribution factor |
|---|---|
| Acetophenone | 63 |
| Benzophenone | >31 |
| Benzaldehyde | 52.5 |
| Benzoic acid ethyl ester | 37 |
| Benzoic acid butyl ester | 33 |
| Benzoic acid benzyl ester | 20 |
| Benzophenone-benzene=1:1 | 23 |
| Benzophenone-benzene=3:1 | 26 |
| Benzophenone-benzene=4:1 | 31 |
| Benzophenone-isopropylether=2.7:1 | 31 |

These distribution factors were determined in the following manner:

Aqueous crude carbolic acid with a content of 9.10 grams of phenols per liter of stock solution was mixed with the same amount of solvent and shaken for one hour in a separatory funnel at normal temperature. The phenol contents of the water and solvent were then determined in known manner.

The water solubility of the unmixed solvent was immeasurably small. After more than three hours of stirring these compounds remained completely stable to aqueous alkaline solutions of 30° C. (pH=9.0).

The result of the investigations is all the more surprising since the cutsomary ketones which are used as solvents for phenol, such as methyl-isobutylketone, diethylketone, methylisopropylketone, methyl-n-propylketone, and the like, have distribution factors which are below 10 and in most cases even below 4.

Acetophenone occupies a special position among the liquids used for the process conforming to the present invention. The following table indicates the surprisingly high distribution factor of acetophenone even in the case of comparatively small phenol contents in aqueous solutions.

| Concentration of crude carbolic acid in the stock solution, grams/liter: | Distribution factor |
|---|---|
| 17.03 | 84.0 |
| 9.10 | 63.0 |
| 4.85 | 55.0 |
| 2.73 | 42.8 |
| 1.06 | 27.4 |

From this table it is apparent that the distribution factor is still greater than 27 even in the case of 0.1% aqueous phenol solutions.

A four-stage extraction of a crude carbolic acid solution containing about 17 grams of phenols per liter of water by the same amount of fresh acetophenone each time had the following result:

| Extraction Stage | Phenol Content of the Water, mg./l. | Distribution Factor |
|---|---|---|
| 0 | 17,035 | |
| 1 | 200 | 84.5 |
| 2 | 37.5 | 4.3 |
| 3 | 10 | 2.7 |
| 4 | 5 | 1.0 |

Of the charged phenol, 0.03% remained in the aqueous solution after four extractions.

The boiling points of the benzoyl compounds suggested as extraction liquids conforming to the invention are generally considerably higher than the boiling point of the phenols. Acetophenone boils at 202° C., benzophenone at 306°, benzoic acid ethyl ester at 213°, and benzoic acid benzyl ester at 324°. Only benzaldehyde has a boiling point which is slightly above 180° and consequently in the range of the boiling point of phenol.

It is also possible to separate the phenols contained in the extraction liquid by a distillation; in this case the lower boiling phenols are distilled off at the head and the extraction media remain as sump product. Because of a certain temperature sensitivity of the extraction media at higher temperatures, the distillation is preferably effected at reduced pressure, for example at a pressure between 200 and 400 mm. mercury column; an inert protective gas, for example nitrogen, carbon dioxide, or the like, is used to prevent an oxidation of the extraction media.

A separation of the phenols by distillation is not considered when acetophenone or benzaldehyde is used. On the contrary, the known chemical reaction of the dissolved phenols with caustic alkali solution with formation of aqueous phenolate solution is used here.

Instead of the separation of the dissolved phenols by distillation, a separation by means of caustic alkali solution is also possible in the case of the remaining extraction media.

In the cases in which mixtures of benzoyl compounds with other low-boiling phenol solvents, such as benzene or isopropyl ether, are used, the separation of the phenol by distillation is effected in several stages; only the low-boiling solvent is distilled off in the first stage and the phenols are distilled off in the second stage. However, the reaction of the dissolved phenols with caustic alkali solution in known manner is also possible in this case.

What is claimed is:

A process for the separation of simple phenols from an aqueous mixture containing simple phenols comprising extracting said phenols from said aqueous mixture with acetophenone.

References Cited by the Examiner

UNITED STATES PATENTS

| | | | |
|---|---|---|---|
| 1,986,320 | 1/35 | Burdick | 260—627 |
| 2,807,654 | 9/57 | Grimmett et al. | 260—627 |

LEON ZITVER, *Primary Examiner.*

CHARLES B. PARKER, HAROLD G. MOORE,
*Examiners.*